(12) United States Patent
Voigtlaender

(10) Patent No.: US 7,173,537 B2
(45) Date of Patent: Feb. 6, 2007

(54) DEVICE FOR PROTECTING AGAINST ACCIDENTAL CONTACT AND METHOD FOR PROTECTING AGAINST ACCIDENTAL CONTACT OF A DISPLACEABLE PART

(75) Inventor: Klaus Voigtlaender, Wangen (DE)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 10/509,342

(22) PCT Filed: Jul. 25, 2003

(86) PCT No.: PCT/DE03/02506

§ 371 (c)(1),
(2), (4) Date: Sep. 28, 2004

(87) PCT Pub. No.: WO2004/061361

PCT Pub. Date: Jul. 22, 2004

(65) Prior Publication Data

US 2005/0145080 A1 Jul. 7, 2005

(30) Foreign Application Priority Data

Dec. 23, 2002 (DE) ................................ 102 61 791

(51) Int. Cl.
| | |
|---|---|
| G08B 13/18 | (2006.01) |
| G08B 13/26 | (2006.01) |
| B26D 5/00 | (2006.01) |
| B26D 5/20 | (2006.01) |
| B27B 3/28 | (2006.01) |
| G05B 5/00 | (2006.01) |
| G05D 1/02 | (2006.01) |

(52) U.S. Cl. ...................... 340/585; 340/552; 340/553; 340/554; 340/565; 340/566; 340/567; 340/573.1; 340/686.3; 340/686.6; 83/58; 83/62; 83/75; 83/76.7; 83/436.2; 83/477.2; 83/781; 318/16; 318/478

(58) Field of Classification Search ........ 340/552–554, 340/686.6, 573.1, 562–567; 83/58, 75, 76.7, 83/62.1, 436.2, 477.2, 781; 318/16, 478
See application file for complete search history.

(56) References Cited

U.S. PATENT DOCUMENTS

| 4,661,797 A | 4/1987 | Schmall |
| 5,081,406 A | 1/1992 | Hughes et al. |

(Continued)

FOREIGN PATENT DOCUMENTS

DE 197 16 035 A1 10/1998

(Continued)

OTHER PUBLICATIONS

Patent Abstract of Japan 2000271797A2, Mar. 24, 1999.

*Primary Examiner*—Daniel Wu
*Assistant Examiner*—Lam Pham
(74) *Attorney, Agent, or Firm*—Michael J. Striker

(57) ABSTRACT

The device according to the invention has a sensor (5) for generating and detecting an electromagnetic field situated in the vicinity of a moving part (1) that should not be touched. The device according to the invention also has an evaluation unit (8) that is connected to the sensor (5) in order to evaluate sensor signals that can be generated by the sensor (5), wherein the evaluation unit (8) can generate an evaluation signal. Finally, a control unit (9) connected to the evaluation unit (8) is provided, which is designed and can be operated so as to control the movement of the part (1) as a function of the evaluation signal.

10 Claims, 9 Drawing Sheets

U.S. PATENT DOCUMENTS

| | | | | |
|---|---|---|---|---|
| 5,986,549 A | * | 11/1999 | Teodorescu | 340/561 |
| 6,853,300 B2 | * | 2/2005 | Kuan | 340/565 |
| 6,959,631 B2 | * | 11/2005 | Sako | 83/58 |
| 6,997,090 B2 | * | 2/2006 | Gass et al. | 83/58 |
| 2002/0017184 A1 | | 2/2002 | Gass et al. | |

FOREIGN PATENT DOCUMENTS

| | | |
|---|---|---|
| DE | 100 31 913 A1 | 1/2002 |
| EP | 0 158 593 A1 | 10/1985 |
| FR | 981 268 | 5/1951 |

* cited by examiner

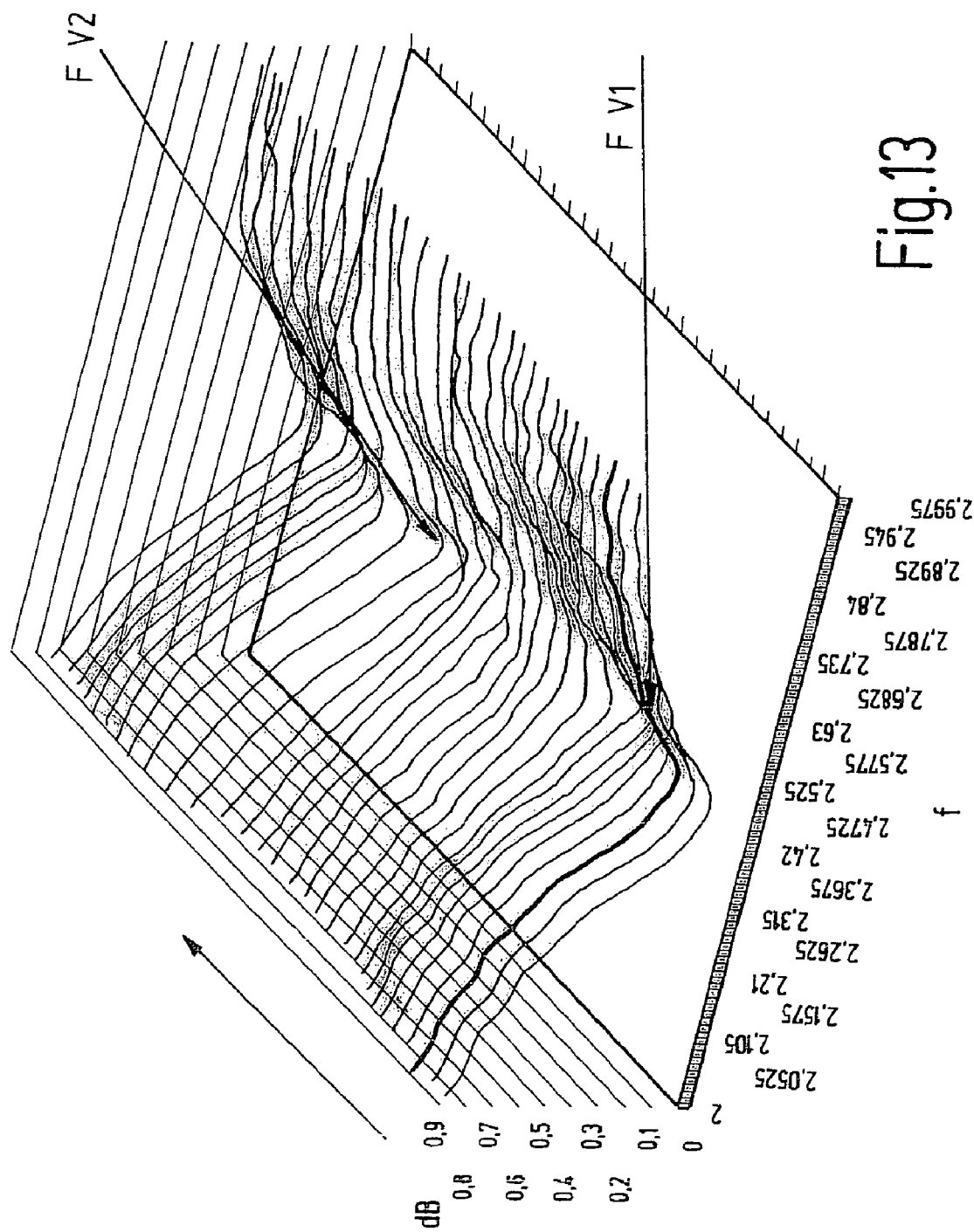

DEVICE FOR PROTECTING AGAINST ACCIDENTAL CONTACT AND METHOD FOR PROTECTING AGAINST ACCIDENTAL CONTACT OF A DISPLACEABLE PART

TECHNICAL FIELD

The invention relates to contact protection device and method for protection against contact with a moving part. Both the method and the device can be used to protect body parts of a person from a saw blade of a table saw.

Injuries caused by circular saws rank among the most frequent workplace accidents. It is important in this context to differentiate between injuries in which fingers are cut or severed while feeding wood in and injuries to fingers, hands, or arms caused when wood pieces are rapidly kicked back or become jammed.

PRIOR ART

A table saw with a safety system is known from the prior art and has been disclosed by US 2002/0017184 A1. The table saw has an adjustable saw blade, a detection system for detecting a contact between a person in the saw blade, and a braking mechanism for stopping the saw blade if the detection system has detected a contact between the person and the saw blade. The system for detecting the contact between a person and a saw blade has a sensor that is embodied as a capacitive sensor. The disadvantage is that the proposed safety system only reacts when a contact between the person and the saw blade has already occurred. No prevention is provided. There is therefore still a very high probability of injury.

Safety devices in the form of guards that cover the region above the saw blade are in fact known, but are often removed to simplify operation. They are therefore either impractical to use or do not offer sufficient protection.

DEPICTION OF THE INVENTION

One advantage of the invention lies in the fact that the proposed contact protection device and the method for protection against contact with a moving part offer a sufficient degree of safety and at the same time, do not to hinder the work of the person operating the machine.

Another advantage of the invention lies in the fact that the contact protection device and the method for protection against contact with a moving part can be easily implemented.

It is also advantageous that a contact between the person and the part that could injure the person, for example the saw blade, can be detected on time so that appropriate safety measures can be taken even before contact with the part that could injure the person occurs.

The contact protection device according to the invention has a sensor for generating and detecting an electromagnetic field in the vicinity of a moving part that should not be touched. The device according to the invention also has an evaluation unit connected to the sensor in order to evaluate the sensor signal that can be generated by the sensor; the evaluation unit can generate an evaluation signal. Finally, the evaluation unit is connected to a control unit that is designed and can be operated in such a way that the movement of the part can be controlled as a function of the evaluation signal.

The method according to the invention for protection against contact with a moving part includes the following steps. An oscillatory circuit generates a high-frequency electromagnetic signal. Then an evaluation unit detects and monitors a characteristic of the electromagnetic signal. Based on the characteristic, a determination is made as to whether influence should be exerted on the movement of the moving part.

Advantageous modifications of the invention ensue from the features disclosed in the dependent claims.

In one embodiment of the invention, the moving part is the saw blade of a stationary circular saw. This makes it possible to protect the person from injuries, for example in the form of lacerations when fingers are cut into or severed or in the form of contusions when wood pieces are rapidly kicked back or become jammed.

In a modification of the contact protection device according to the invention, an additional sensor is provided. The two sensors are located on the two sides of the saw blade. This makes it possible to further increase safety during the operation of the circular saw.

Alternatively, the device according to the invention can also be provided with three additional sensors. Two of the sensors are located on each side of the saw blade. This makes it possible to increase the accuracy in detecting the front edge of the saw blade.

In order to attain the object, the invention also proposes that the sensor of the device according to the invention have a flat antenna for generating electromagnetic waves. This simplifies implementation.

In another embodiment of the invention, the sensor is located on the underside of a jam guard for the saw blade. This has the advantage of protecting the sensor from mechanical damage and at the same time, allowing for design freedom with regard to the top side of the working surface of the circular saw.

The contact protection device according to the invention is advantageously provided with an oscillatory circuit connected to the antenna and the evaluation unit is designed so that it can evaluate the detuning of the oscillatory circuit.

It is particularly advantageous if the waves emitted by the antenna of the device according to the invention lie in the range of the ISM band. Using the frequencies within this band is permitted worldwide and significantly facilitates the process of obtaining permits from the involved authorities.

In a modification of the method according to the invention for protection against contact with a moving part, the detuning of the oscillatory circuit serves as a characteristic. This makes it easily possible to differentiate between whether the work piece or a finger of the person guiding the work piece is about to come into contact with the saw blade.

In another modification of the method according to the invention, the resonance frequency of the oscillatory circuit and/or the speed of the change in the resonance frequency and/or the number of resonance frequencies can serve as a characteristics. These characteristics are easy to determine and permit a sufficient conclusion to be drawn regarding the situation at hand.

Finally, with the method according to the invention, a change in the torque of the moving part can be detected and the change in the torque can additionally be used to determine whether influence should be exerted on the movement of the moving part. This further increases the accuracy of the detection.

BRIEF DESCRIPTION OF THE DRAWINGS

A number of exemplary embodiments of the invention will be explained in detail below in conjunction with twelve figures.

FIG. 13 shows a measured frequency curve when cutting through wood and a finger.

WAYS TO EMBODY THE INVENTION

Figure 1:
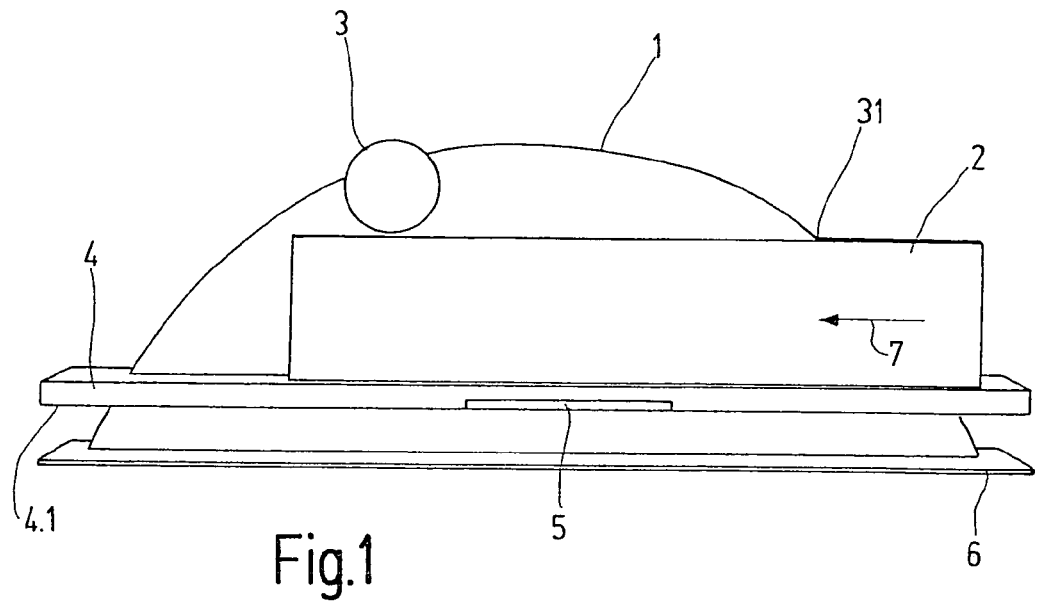
FIG. 1 shows a schematically depicted detail of a circular saw with a device according to the invention.

FIG. 1 shows a detail of a stationary circular saw with the contact protection device according to the invention. A work piece 2, for example a piece of wood, is slid in the movement direction 7 across a table, parallel to the saw blade 1. The saw blade 1 therefore cuts the work piece 2 apart at the cutting edge 31. In order to guide the work piece 2 and to hold it down, a person holds the work piece with his fingers in the immediate vicinity of the saw blade 1. This is indicated in FIG. 1 by a schematically depicted finger labeled with the reference numeral 3. In order to prevent the finger of the person from coming into contact with the saw blade 1, the contact protection device according to the invention is provided with a sensor 5 located in the immediate vicinity of the saw blade 1. In the exemplary embodiment shown in FIG. 1, the sensor 5 is located on the underside 4.1 of the jam guard 4 that encompasses the saw blade 1. The jam guard 4 can be embodied as a plastic part and prevents the saw blade 1 from jamming, for example when it is set at an angle in relation to the work table or when the work piece exerts a load on the saw blade lateral to the sawing direction. In addition, the jam guard 4 allows different thicknesses of saw blades to be used without causing the saw blade 1 to jam. The jam guard 4 is also referred to below as the radome (radar dome). The jam guard 4 serves to protect the sensor 5 from damage and, if it is made of plastic, simultaneously serves to electrically insulate the sensor 5.

The antenna of the sensor 5 is embodied as a patch antenna and has a planar design. The antenna is excited with a frequency of 2.45 MHz, for example, in relation to a mass 6 disposed underneath it, which is also referred to as a reference potential.

Figure 4:
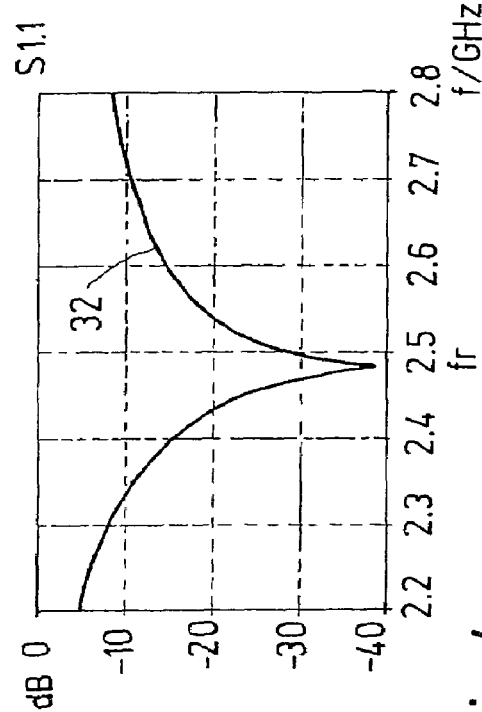
FIG. 4 shows the frequency curve of the measurement signal when the circular saw is running, without a work piece.
Figure 4:
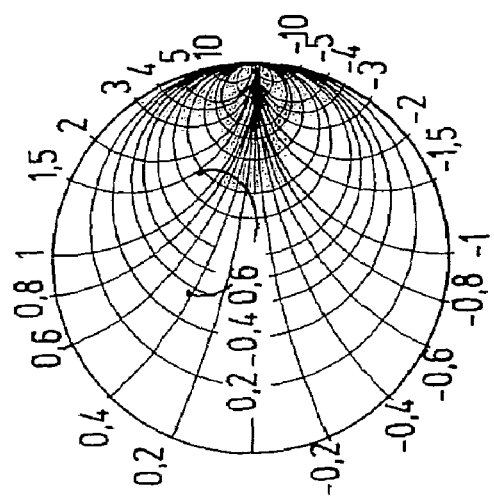
Figure 3:
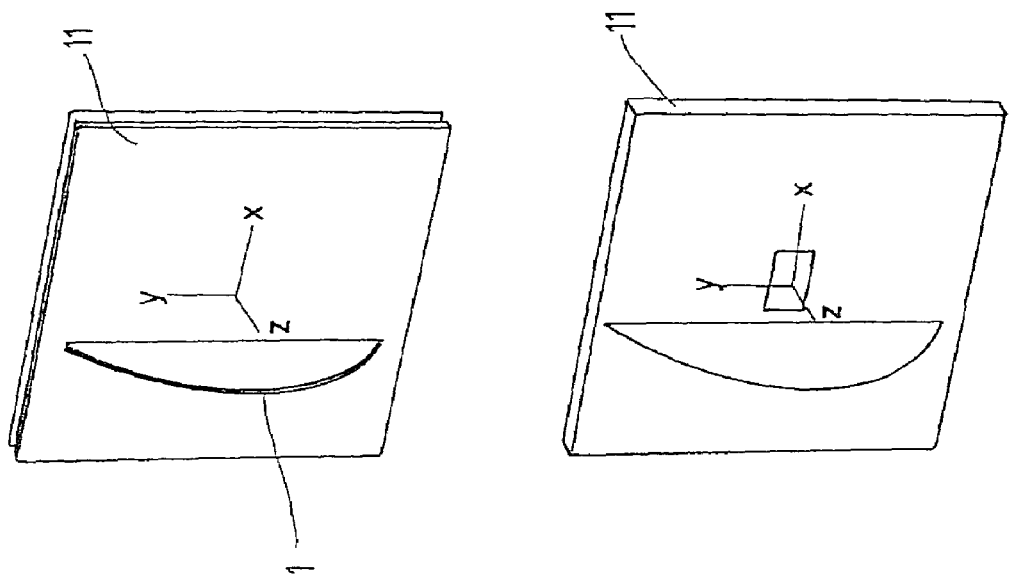
FIG. 3 shows a detail of the circular saw with the saw blade, but without a work piece.

If the saw blade 1 is running at idle as shown in FIG. 3, i.e. neither a work piece 2 nor a finger 3 or hand of a person is in the vicinity of the saw blade 1, then this yields the frequency spectrum shown in FIG. 4. It is clear that the frequency spectrum 32 has only one resonance frequency fr at approx. 2.48 GHz. The bottom region of FIG. 4 shows the corresponding Smith chart for the operation at idle.

Figure 6:
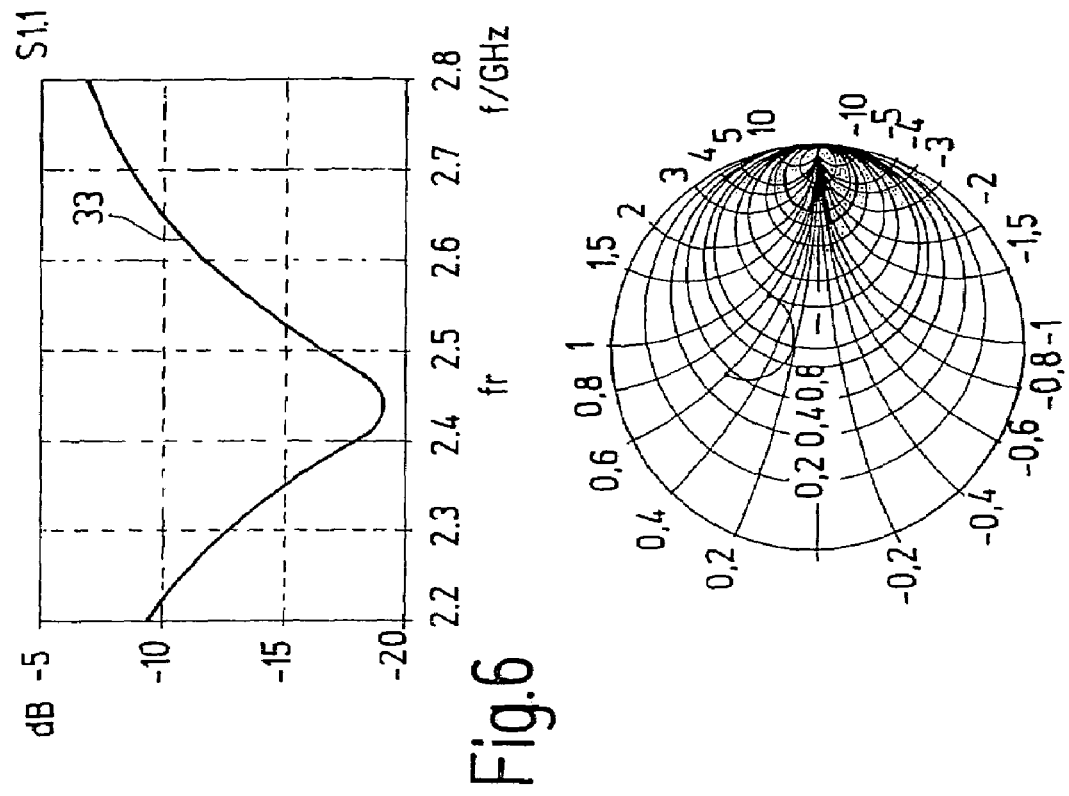
FIG. 6 shows the frequency curve of the measurement signal when the circular saw is cutting through the work piece.
Figure 5:
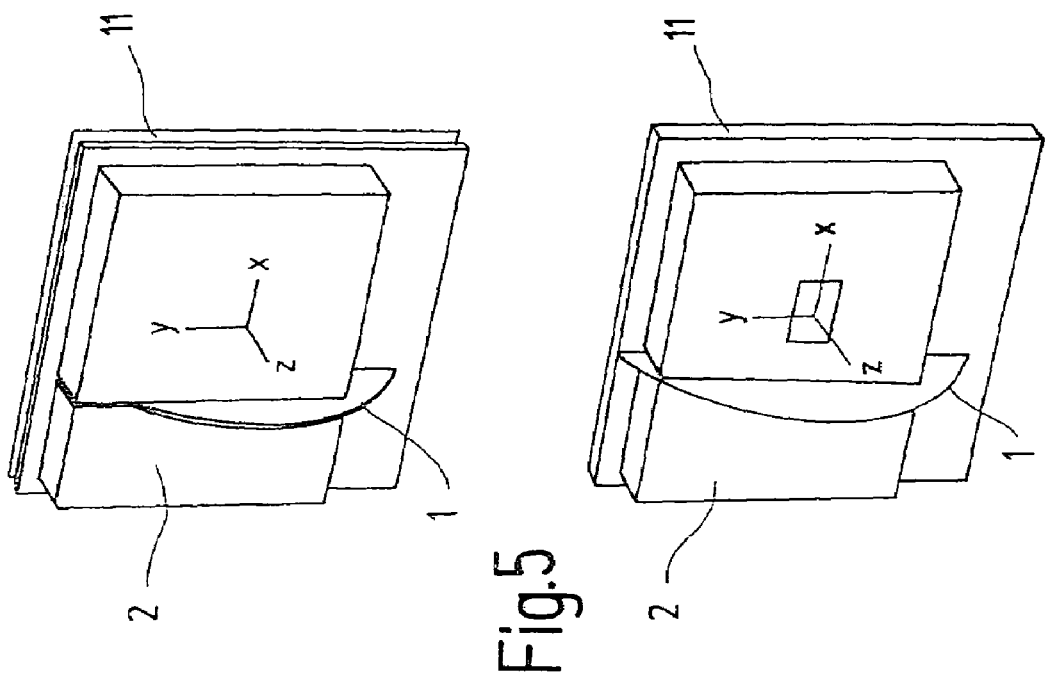
FIG. 5 shows the circular saw when it is sawing a work piece apart.

If a work piece 2 is then brought into the vicinity of the saw blade 1, as shown in FIG. 5, then this yields the frequency graph 33 shown at the top in FIG. 6; it is clear that the reference frequency fr has shifted slightly and is now at approx. 2.44 GHz. It is also clear from FIG. 6 that the adaptation has changed slightly. However, the curve is still smooth. The change occurs in the range from 2 to 10 cm per second and can be adaptively tracked as a measurement shift.

Figure 8:
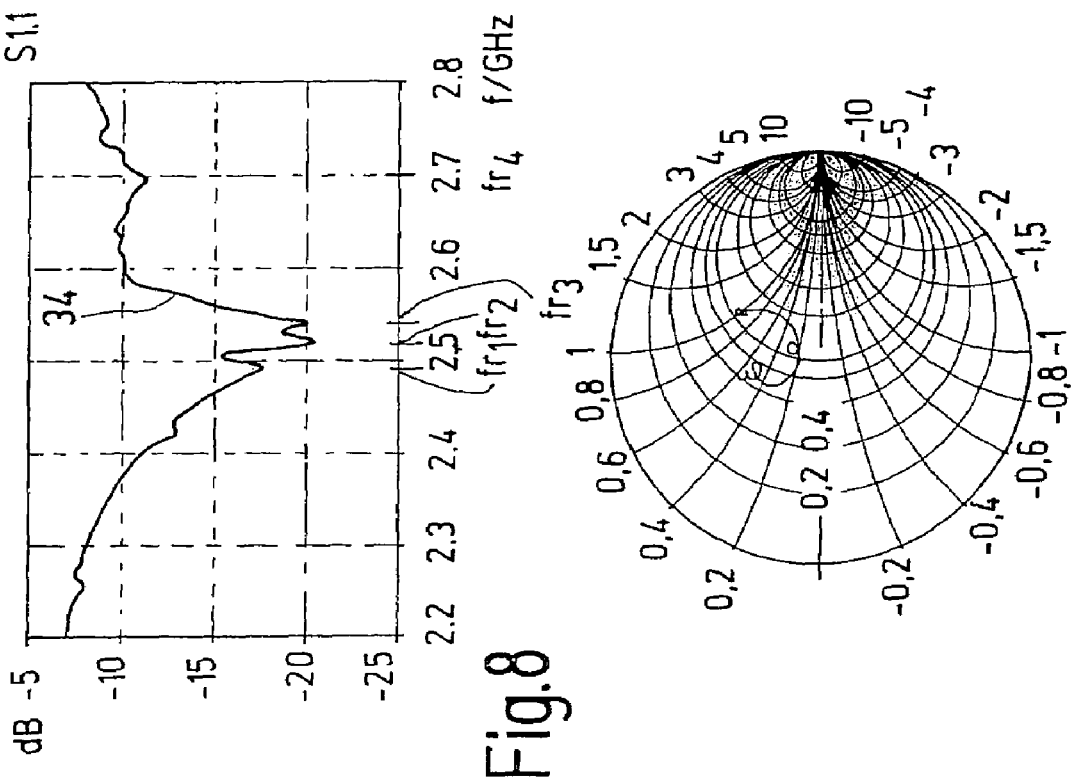
FIG. 8 shows the frequency curve of the measurement signal when the circular saw is cutting into a work piece and a finger.
Figure 7:
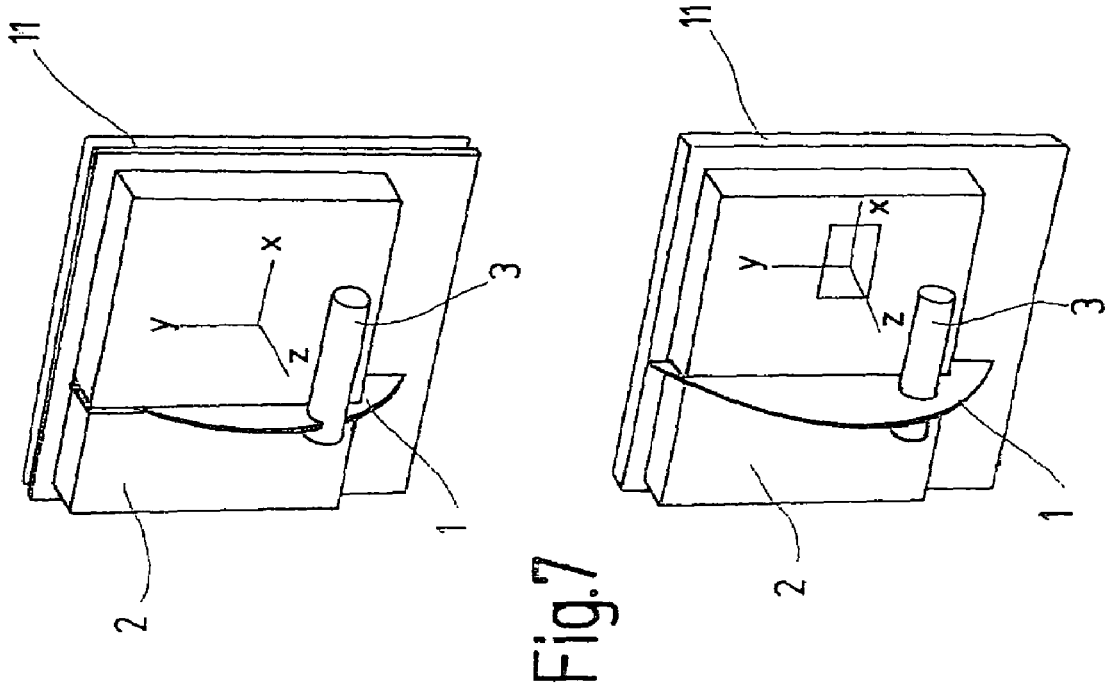
FIG. 7 shows the circular saw when it is cutting through a work piece and a finger at the same time.

If a finger 3 then approaches the saw blade 1 as shown in FIG. 7, then this results in a severe detuning of the oscillatory circuit, which is evidenced by a shifting of the resonance frequency fr and by the presence of a number of subresonances. FIG. 8 shows the corresponding frequency graph with the associated frequency curve 34. Now the curve shows a series of resonance frequencies fr1, fr2, fr3, and fr4. The corresponding Smith chart is shown in the bottom region of FIG. 8.

It is clear that as the finger 3 approaches the saw blade 1, the resonance frequency is continuously shifted downward. In addition, dielectric losses cause a broadening of the resonance curve. This can also be seen in FIG. 13. In the graph shown in FIG. 13, the damping in dB is plotted vertically and the frequency is plotted as increasing toward the right. The frequency curves FV1 toward the front represent the leading edge of the wood in contact with the saw blade 1 and the frequency curves FV2 further toward the back represent the finger 3 in contact with the saw blade 1.

This detuning can occur at the advancing speed at which the work piece is slid along the saw blade 1, which would lead to a cutting or severing of the finger 3. With the aid of an adaptive algorithm for adaptive frequency regulation, it is possible to detect additional subordinate maxima or additional resonance frequencies fr1–fr4, which makes it possible to detect the presence of a finger or hand.

However, the detuning can also occur with an abrupt movement of the finger 3, caused by a kickback or jamming of the work piece 2. A rapid change in the frequency spectrum can be evaluated directly and permits a conclusion to be drawn as to whether the work piece has caused a kickback or the saw blade 1 has become jammed or whether there is in fact no danger in this regard.

Once the saw blade has reached its nominal speed, the Doppler effect generated by the saw blade 1 yields a constant value and can therefore be eliminated so that the Doppler effect does not cause false triggerings.

If other data are available, for example the slippage of the saw and/or the change in the torque of the saw blade 1, then these can be included in the evaluation.

The parameters of the antenna and the material used to produce the jam guard 4 are selected so that normal wood demonstrates an optimum measurement effect, i.e. a favorable adaptation at the center frequency.

Figure 9:
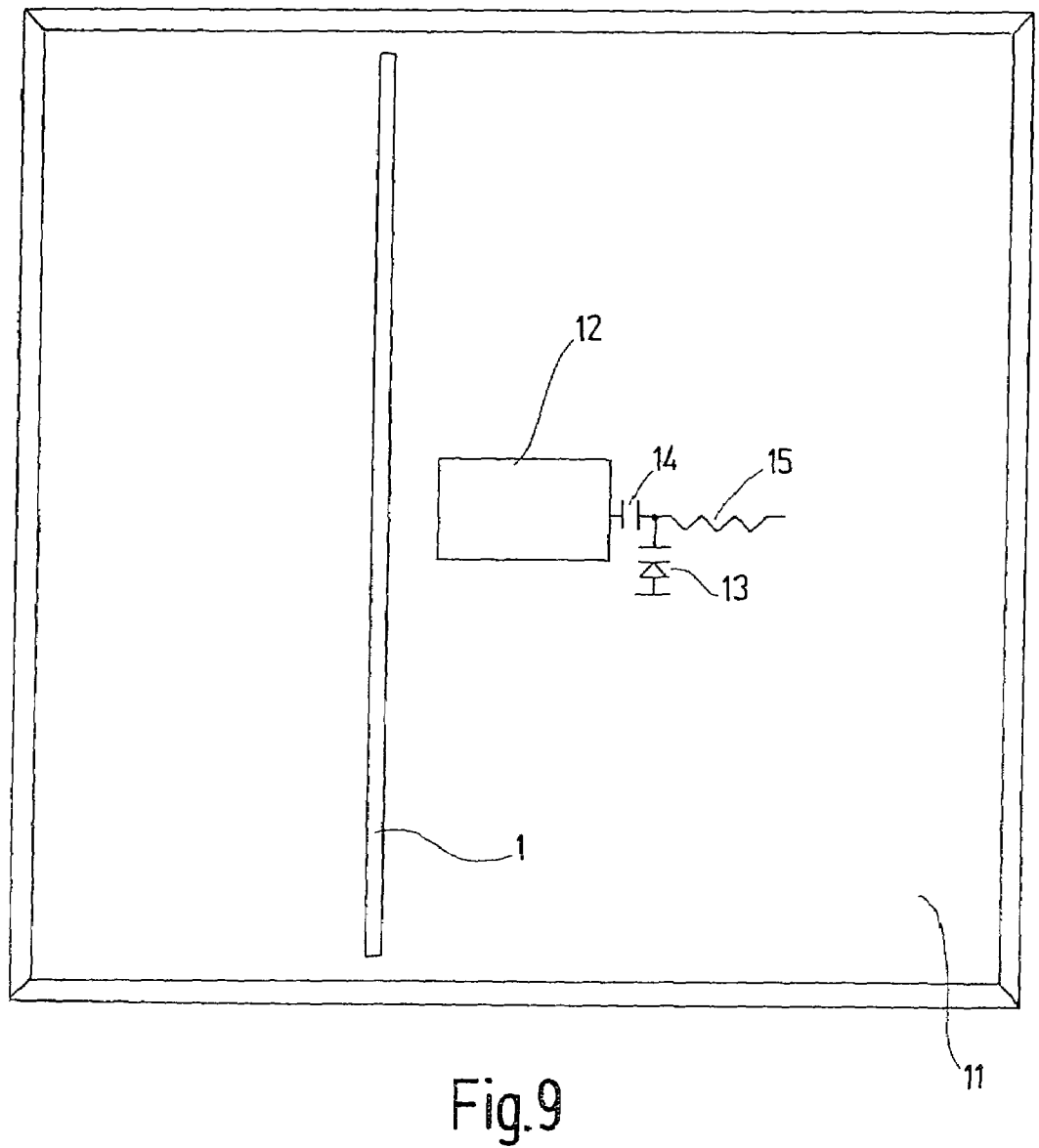
FIG. 9 is a top view of a possible placement of the sensor in relation to the circular saw blade.

FIG. 9 shows a top view of the location of the sensor with the antenna 12, a capacitor 14 connected to it, an inductance 15, and a varactor diode 13 connected to ground. It is clear that the antenna 12 is located in the vicinity of the saw blade 1, parallel to the surface of the work table 11. In the exemplary embodiment shown in FIG. 9, the antenna 12 is also located at the center of the saw blade 1 when viewed from above.

Figure 11:
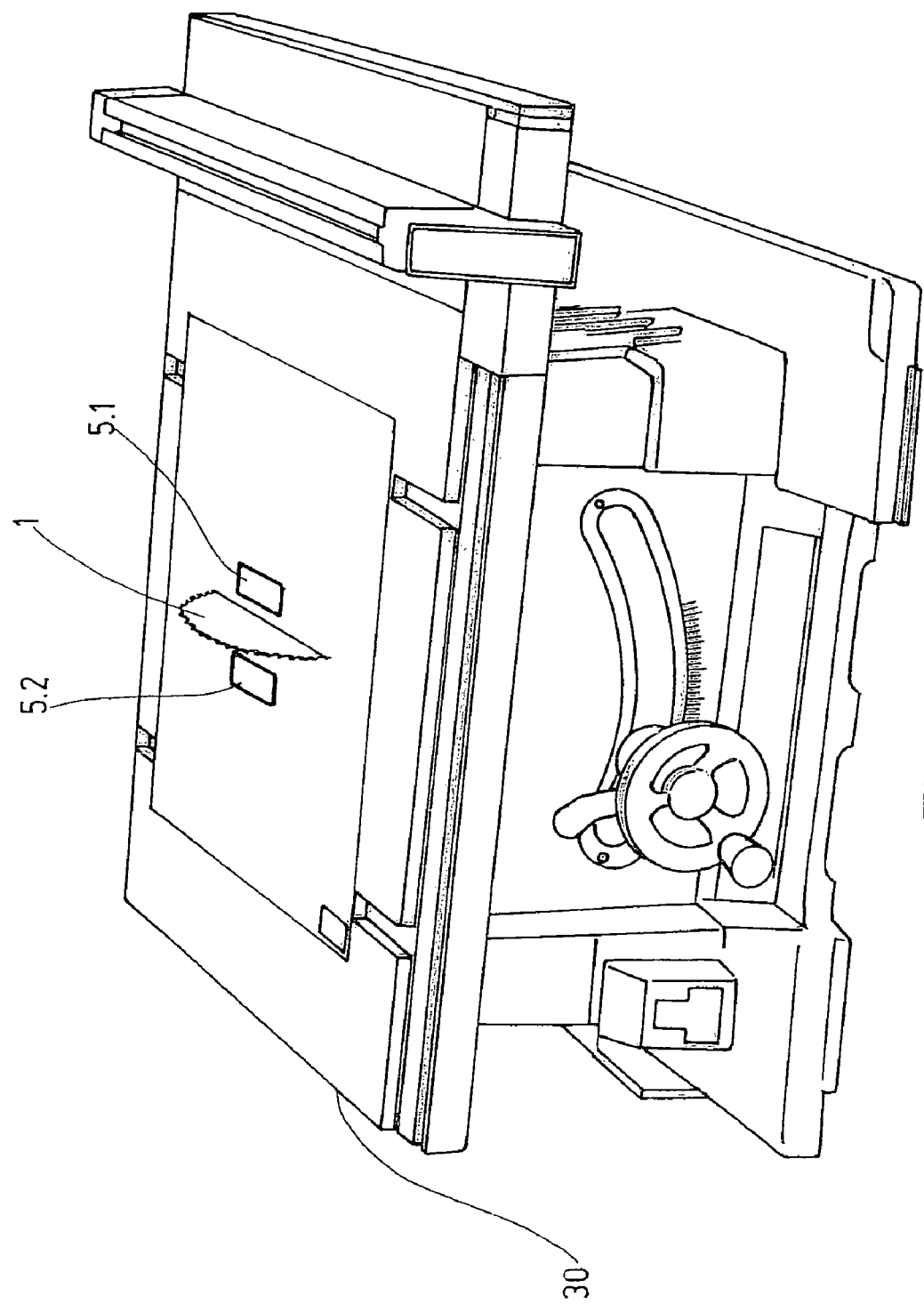
FIG. 11 shows a table saw with two sensors for contact detection.
Figure 12:
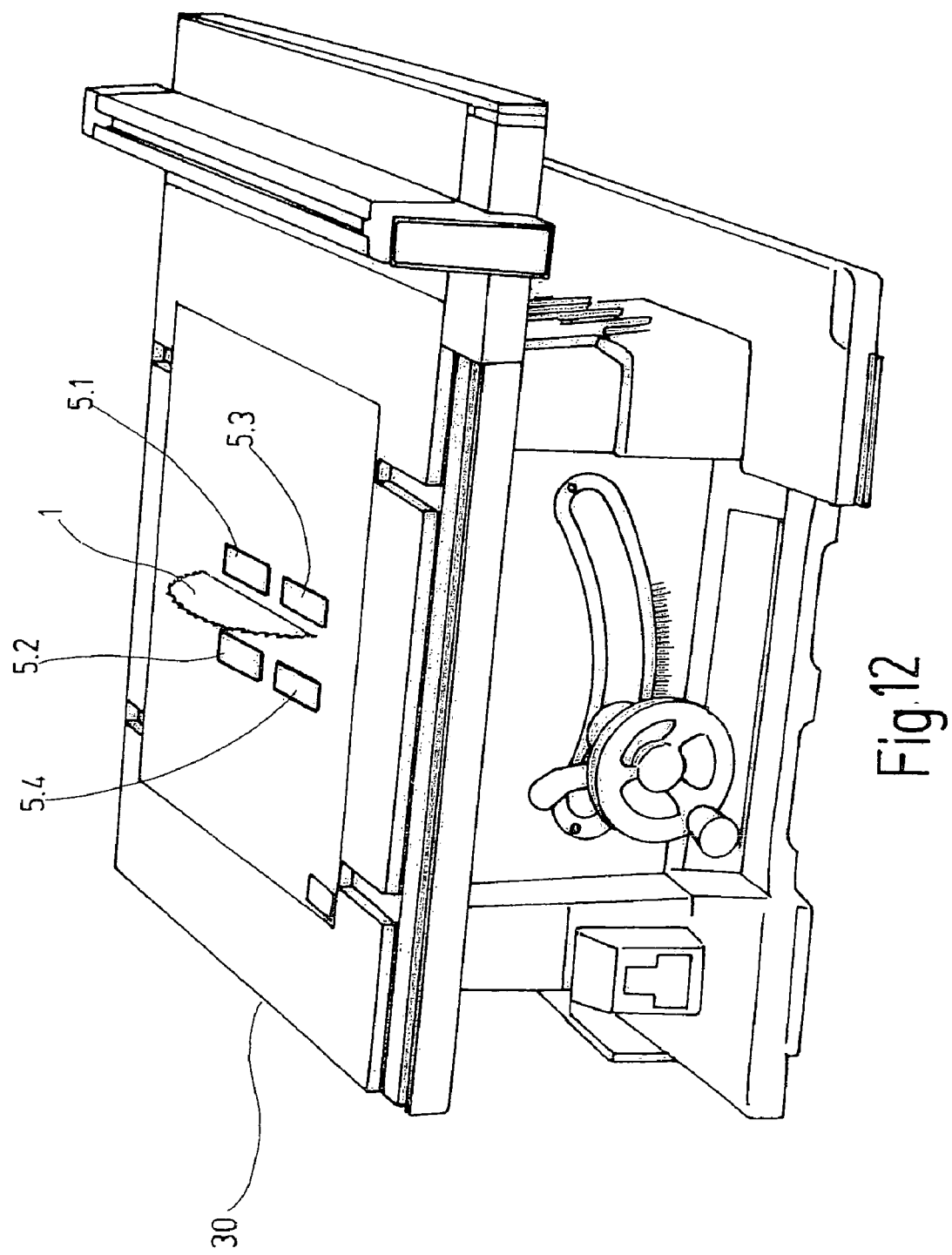
FIG. 12 shows a table saw with four sensors for contact detection.

If other sensors are provided, then they can be positioned as shown in FIGS. 11 and 12.

In FIG. 11, a first sensor 5.1 is located on the right side of the saw blade 1 and a second sensor 5.2 is located on the left to the saw blade. The two sensors are positioned in the center of the saw blade 1 when viewed from above.

In the embodiment shown in FIG. 12, two additional sensors 5.3 and 5.4 are positioned in the front region of the saw blade 1; the sensor 5.3 is located along with the sensor 5.1 on the one side of the saw blade and the sensor 5.4 is located along with the sensor 5.2 on the other side of the saw blade. The two sensors 5.3 and 5.4 are positioned in the work table 11 so that they can detect when a body part, for example a finger or hand, moves into the vicinity of the saw edge. The two sensors 5.1 and 5.2 can detect kickbacks caused by the work piece 2.

For improved position determination, it is helpful to work with two or more sensors. In order to increase the accuracy of detection at the saw edge 31, it is possible to provide two additional sensors, as shown in FIG. 12. The individual antennas 12 here can also be rotated out from the plane by a certain angle, for example by 30°, to permit better coverage and detection of the front region of the circular saw, i.e. the saw edge 31. The jam guard 4 here can still be embodied as planar on the top side since the sensors are positioned on the underside 4.1 of the jam guard 4.

Figure 2:
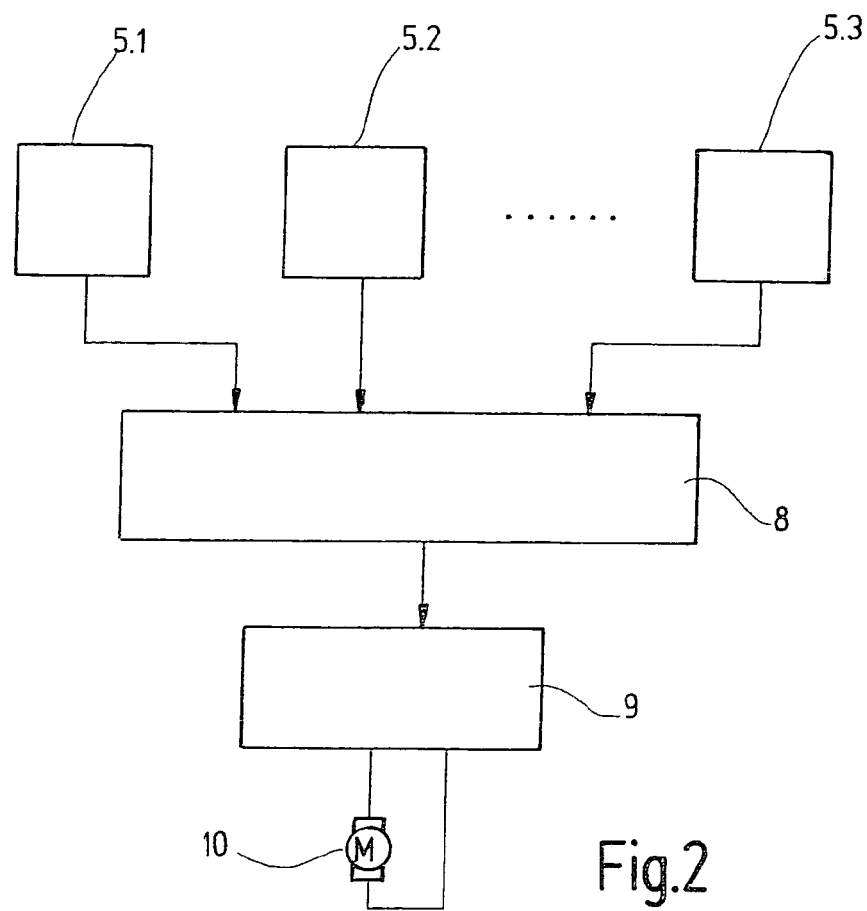
FIG. 2 is a block circuit diagram of a possible embodiment form of the electrical part of the device according to the invention.

If several sensors 5.1, 5.2, and 5.3 are used, then the block circuit diagram depicted in FIG. 2 is used for the interconnection of the electrical components of the contact protection device according to the invention. The sensors 5.1, 5.2, and 5.3 are connected to an evaluation unit 8, which evaluates the measurement signals emitted by the sensors 5.1, 5.2, and 5.3 and sends a corresponding selection signal to a control unit 9. Based on the selection signal, the control unit 9 then determines whether a motor 10 that serves to drive the saw blade 1 should be influenced, for example by means of braking. The control unit 9 can also be connected to other components, for example an active brake or a device for automatically lowering the saw blade 1. In addition to the sensors 5.1, 5.2, and 5.3, still other sensors can also be connected to the evaluation unit 8.

The reflection damping can be evaluated by means of a standing wave bridge or a directional coupler. A phase change can be detected with the aid of a phase detector. To this end, the operating frequency is swept in the permissible range. It is also possible to use measuring methods of the kind used in network analyzers (vector network analyzers).

In order to stop the circular saw or the saw blade 1 of the circular saw when the saw blade is contacted or just before this occurs, a method is used that is based on the resonance shift in the microwave range generated by the influence of body parts, for example a finger or hand. The ISM band from 2,400 MHz to 2,483.5 MHz is selected as the frequency band since antennas for this frequency band are readily available and the main material to be machined, namely wood or plastic, is still penetrated to a material depth of approximately 10 cm due to the skin effect. Alternative frequency ranges are 433 MHz, 866 MHz, or 5.8 GHz. The use of these ISM bands assures the possibility for worldwide approval.

The fundamental concept of the invention is based not on a radar distance measurement but instead, makes an evaluation in the microsecond range of a change in the dielectric encompassing the antenna. It is also possible to evaluate an electric change.

If a finger, whose dielectric constant $\epsilon r$ lies in a range between 40 and 80, approaches the saw blade, then a severe detuning of the antenna occurs.

In order to limit the required frequency band, an adaptive (slow) regulation can be used, which masks material changes, for example different material thicknesses, a leading and trailing edge of the work piece, knots, and the like, and always shifts the operating frequency into an optimum position.

This makes it possible to also detect external interference from other ISM devices such as microwave ovens, devices with a Bluetooth interface, or small radio networks for data transmission and to effectively suppress this interference through suitable measures.

A slow adaptive regulation can be used to mask material changes and to always shift the operating frequency into an optimum position. To this end, the center frequency of the antenna 12 is detuned via the oscillatory circuit comprised of the capacitor 14, the varactor diode 13, and the inductance 15. The array here can either be connected once or in the symmetrical center in terms of the resonant length. If external interferences at certain frequencies are detected, then the evaluation frequency can also be shifted.

Figure 10:
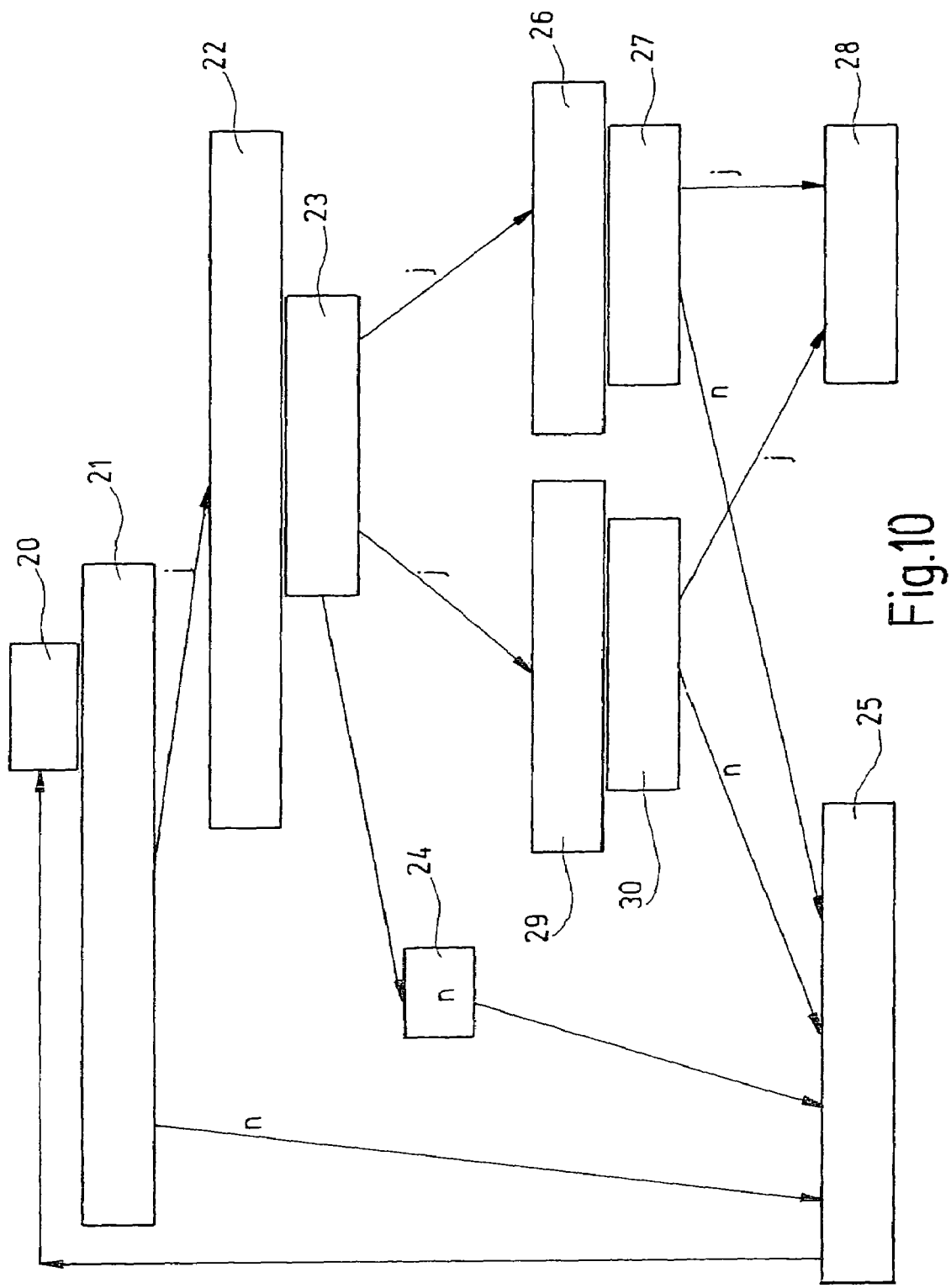
FIG. 10 shows a flow chart of a possible embodiment of the contact protection method according to the invention.

FIG. 10 shows the flowchart for the evaluation of the sensor signal. The contact prevention method is described in conjunction with a contact prevention device that has two sensors. If the first sensor 5.1 signals a resonance shift, represented by step 21 and the arrow labeled J leading from it, then in steps 22 and 23, a determination is made with the aid of the second sensor 5.2 as to whether the measurement signals emitted by the two sensors indicate similar effects. If this is not the case, i.e. if the two measurement signals differ significantly from each other, then it can be assumed that the finger or fingers are not touching the saw blade and will be conveyed past it. The process then follows branch 24 to step 25. But if the two sensors 5.1 and 5.2 emit similar and rapidly changing measurement results, then it can be assumed that the work piece has caused a kickback, requiring an immediate stop 28 of the saw blade 1. The detection is executed by means of a fast algorithm 27. In the event of a slow change, characterized by step 29, a slow algorithm 30 is used to determine whether the change has been caused by the work piece or whether a body part has traveled into the immediate vicinity of the saw blade 1. The slow algorithm 30 detects this and in the event of danger, the process moves to step 28 in which measures are taken to stop the saw blade. Otherwise, the process moves to step 25.

Since the movements that occur are usually steady, it is also possible use SAR (synthetic aperture radar) methods.

The device according to the invention is not limited to the use on a circular saw. The device according to the invention can also be used to protect human body parts in the vicinity of band saws, presses, drills, or special purpose machines with protection devices. In order to accommodate the sensor, it is sufficient to provide a flat surface approximately 50 cm by 50 cm, which is covered by the dielectric radome. The sensor can be supplied with voltage via electrical connections and the measurement data and evaluation data can be transmitted via a data interface.

The embodiment according to the invention has the advantage over an optical monitoring of not requiring an optical connection between the fingers and the sensors. Instead, objects such as the work piece can be positioned between the sensor and the fingers.

The preceding description of exemplary embodiments according to the current invention is intended exclusively for illustrative purposes and is not intended to limit the invention. Various changes and modifications can be made without going beyond the scope of the invention and its equivalents.

The invention claimed is:

1. A device for protecting a body part of a person from contact with a rotating saw blade of a circular saw, comprising a sensor for generating and detecting an electromagnetic field situated in the vicinity of the saw blade (1); an evaluation unit (8) connected to the sensor (5) for evaluation of sensor signals that are generated by the sensor (5), and generation of an evaluation signal; and a control unit (9) connected to the evaluation unit (8), which is configured so as to control a movement of the saw blade (1) as a function of the evaluation signal, wherein the sensor (5) is positioned on an underside (4.1) of a jam guard (4) for the saw blade (1).

2. The device according to claim 1, characterized in that another sensor (5.2) is provided, wherein the two sensors (5.1, 5.2) are positioned on the two sides of the saw blade (1).

3. The device according to claim 1, characterized in that three additional sensors (5.2, 5.3, 5.4) are provided, wherein two sensors (5.1, 5.3; 5.2; 5.4) are positioned on each side of the saw blade (1).

4. The device according to claim 1, characterized in that the sensor (5) has a flat antenna (12) for generating electromagnetic waves.

5. The device according to claim 4, characterized in that an oscillatory circuit connected to the antenna (12) is provided and that the evaluation unit (8) is designed so that it can evaluate the detuning of the oscillatory circuit.

6. The device according to claim 4, characterized in that the waves that can be emitted by the antenna (12) lie in the range of the ISM band.

7. A method for protecting a body part of a person from contact with a rotating saw blade of a circular saw, comprising the steps of generating a high-frequency electromagnetic signal by an oscillatory circuit and an antenna (12) of a sensor (5) positioned on an underside (4.1) of a jam guard (4) for the saw blade (1); detecting and monitoring a characteristic of the electromagnetic signal by an evaluation unit; and based on the characteristic, making a determination as to whether influence should be exerted on the rotation of the saw blade (1).

8. The method according to claim 7, characterized in that the detuning of the oscillatory circuit serves as the characteristic.

9. The method according to claim 7, characterized in that the resonance frequency ($f_r$) of the oscillatory circuit and/or the speed of the change in the resonance frequency and/or the resonance broadening serves as the characteristic.

10. A method for protection against contact with a moving part, characterized by means of the following steps:
a high-frequency electromagnetic signal is generated by an oscillatory circuit and an antenna (12),
an evaluation unit (8) detects and monitors a characteristic of the electromagnetic signal, and
based on the characteristic, a determination is made as to whether influence should be exerted on the movement of the moving part (1), and characterized in that a change in the torque of the moving part (1) is detected and the change is also used to determine whether influence should be exerted on the movement of the moving part (1).

* * * * *